(12) United States Patent
Wilkinson et al.

(10) Patent No.: US 11,566,709 B2
(45) Date of Patent: Jan. 31, 2023

(54) METHOD OF FORMING A PILLAR LANTERN RING FOR A SHAFT SEALING SYSTEM

(71) Applicants: Mark R. Wilkinson, Huntington, MA (US); Thomas B. Monahan, Holyoke, MA (US)

(72) Inventors: Mark R. Wilkinson, Huntington, MA (US); Thomas B. Monahan, Holyoke, MA (US)

(73) Assignee: SEAL-Ryr CORP., Westfield, MA (US)

( * ) Notice: Subject to any disclaimer, the term of this patent is extended or adjusted under 35 U.S.C. 154(b) by 74 days.

(21) Appl. No.: 17/335,015

(22) Filed: May 31, 2021

(65) Prior Publication Data

US 2021/0285547 A1 Sep. 16, 2021

Related U.S. Application Data

(63) Continuation of application No. 16/144,329, filed on Sep. 27, 2018, now Pat. No. 11,054,036.

(51) Int. Cl.
*F16J 15/18* (2006.01)

(52) U.S. Cl.
CPC .................. *F16J 15/183* (2013.01)

(58) Field of Classification Search
CPC .................. F16J 15/18; F16J 15/183
See application file for complete search history.

(56) References Cited

U.S. PATENT DOCUMENTS

| | | |
|---|---|---|
| 1,830,286 A | 11/1931 | Moore |
| 2,321,927 A | 6/1943 | McCoy et al. |
| 2,511,109 A | 6/1950 | Haskell |
| 2,791,194 A | 5/1957 | Janise |
| 3,578,342 A | 5/1971 | Satterthwaite et al. |
| 3,907,307 A | 9/1975 | Maurer et al. |
| 3,947,157 A | 3/1976 | Sadler et al. |
| 4,047,858 A | 9/1977 | Zalis |
| 4,270,760 A | 6/1981 | Greiman |
| 4,298,207 A | 11/1981 | Case et al. |
| 4,301,893 A | 11/1981 | St. Jean et al. |
| 4,371,180 A | 2/1983 | Case et al. |
| 4,431,698 A | 2/1984 | Case et al. |
| 4,498,681 A | 2/1985 | Heinz |
| 4,559,862 A | 12/1985 | Case et al. |

(Continued)

FOREIGN PATENT DOCUMENTS

| | | | | |
|---|---|---|---|---|
| CA | 3056358 A1 | * | 3/2020 | ............. F16J 15/183 |
| CN | 110641627 A | * | 1/2020 | ............ B29C 64/118 |

(Continued)

*Primary Examiner* — Eugene G Byrd
(74) *Attorney, Agent, or Firm* — Michael I. Wolfson

(57) ABSTRACT

A fluid sealing system for a rotary mechanical device including a pillar lantern ring having a bottom and a top end cap with pillars or columns connecting the end caps is formed by additive manufacturing. The bottom annular end cap has an outside face and an opposed inside face defining a height therebetween and the upper annular end cap has an inside face and an opposed outside face defining a height therebetween with a plurality of integrally formed substantially cylindrical axial columns connecting the two opposed inside faces of the two end caps.

15 Claims, 9 Drawing Sheets

(56) References Cited

U.S. PATENT DOCUMENTS

| | | | |
|---|---|---|---|
| 4,572,519 A | 2/1986 | Cameron et al. | |
| 4,643,581 A | 2/1987 | Soechtig et al. | |
| 4,765,631 A | 8/1988 | Kohnen et al. | |
| 5,013,053 A | 5/1991 | Champlin | |
| 5,056,757 A | 10/1991 | Wood | |
| 5,092,609 A | 3/1992 | Balzano et al. | |
| 5,370,926 A | 12/1994 | Hopper | |
| 5,660,398 A | 8/1997 | Terao et al. | |
| 6,367,809 B1 | 4/2002 | Weehunt | |
| 8,939,646 B2 | 1/2015 | Forrest | |
| 10,365,270 B2 * | 7/2019 | Shellef | G01N 33/542 |
| 2003/0026718 A1 | 2/2003 | Dziver et al. | |
| 2003/0107183 A1 | 6/2003 | Wilkinson | |
| 2005/0200081 A1 | 9/2005 | Stanton et al. | |
| 2013/0061954 A1 | 3/2013 | Giove et al. | |
| 2014/0325791 A1 | 11/2014 | Colverson et al. | |
| 2015/0204445 A1 * | 7/2015 | Witte | B29B 7/80 277/300 |
| 2017/0204974 A1 | 1/2017 | Ruffin et al. | |
| 2017/0130729 A1 | 5/2017 | Getto et al. | |
| 2019/0383399 A1 | 12/2019 | Mihm et al. | |

FOREIGN PATENT DOCUMENTS

| | | | | |
|---|---|---|---|---|
| CN | 107002921 B | * | 2/2020 | B22F 10/00 |
| CN | 112423966 A | * | 2/2021 | B29C 48/02 |
| CN | 213412927 U | * | 6/2021 | |
| GB | 2056588 A | * | 3/1981 | F16J 15/183 |
| WO | WO-2020197560 A1 | * | 10/2020 | E21B 33/1208 |

* cited by examiner

METHOD OF FORMING A PILLAR LANTERN RING FOR A SHAFT SEALING SYSTEM

CROSS-REFERENCE TO RELATED APPLICATION

This application is a continuation application of and is based upon and claims the benefit of the filing date of co-pending, commonly owned U.S. patent application Ser. No. 16/144,329, filed Sep. 27, 2018, which is incorporated herein by reference in its entirety.

FIELD OF THE INVENTION

This invention relates to a lantern ring for a shaft sealing system for a mechanical device having a shaft passing through a stuffing box, and more particularly to the method of manufacture of a lantern ring that has a pillar or columnar structure between the end caps of the lantern ring to provide an increased flush reservoir in the stuffing box.

BACKGROUND OF THE INVENTION

Rotary mechanical devices, such as mixers and centrifugal pumps, include an impeller mounted on a shaft that is driven by a power source, such as an electric motor. The shaft passes through the seal cavity or stuffing box defined by a cylindrical cavity in the device housing. The shaft is supported by bearings at the motor end of the device. Seals are placed in the stuffing box to prevent process fluid from passing through the seal cavity and reaching the bearing and the motor, potentially causing damage to both.

In mechanical pumps, the seal cavity restricts passage of chemical fluids or solvents being pumped, many of which are corrosive. Accordingly, it is important that appropriate packing material is placed within the seal cavity. A seal fluid, such as water, is pumped into the seal cavity through a flush port to prevent the fluid being pumped or mixed from travelling along the shaft to the bearings and motor and to provide lubricant to the rotating shaft. Over extended use, the pump shaft may develop a whip as the bearings wear. IN view of this, it may be desirable to provide a sealing system including a bearing to reduce whip that can occur as the shaft rotates, and a lantern ring that provides for increased flush to form an effective seal to limit the amount of product from entering the seal cavity.

There are a wide variety of shaft sealing systems available. One such commercially successful device is described and claimed in Wilkinson, U.S. Pat. No. 6,834,862 for SHAFT SEALING SYSTEM FOR A ROTARY MECHANICAL DEVICE, issued on Dec. 28, 2004. Here, a bearing with an integral lantern ring provides shaft support, and the lantern ring portion allows for addition of flush fluid to the seal cavity. Such bearing elements are custom made for a particular application.

In applications where a separate lantern ring is utilized, one such solution was illustrated earlier in Heinz, U.S. Pat. No. 4,498,681 for UNIVERSAL SEAL CAGE LANTERN RING WITH CHANNELS AND FLUID SLOTS, issued on Feb. 12, 1985. Here, a flexible ring having two ends or lands having an outer groove and an inner groove with spaced holes through the grooves for passage of seal fluid from an external port to the rotating shaft is provided.

These solutions for a standard 2.5 inch bore with a shaft diameter of 1.75 inch include cylindrical bearings with an integral lantern ring, or cylindrical bearings or bushings together with an isolated lantern rings typically have between about six and eight holes formed between the outer surface of the lantern ring groove and the inner surface. While these solutions are highly acceptable for many applications, it is desirable to provide alternative sealing solutions that provide for an increased flush reservoir to the stuffing box to protect against a stoppage or hiccup in the flow of seal fluid at a reduced cost.

SUMMARY OF THE INVENTION

Generally speaking, in accordance with the invention, an improved lantern ring having two end caps with pillars or columns between the end caps of the lantern ring is provided. The pillars or columns are axial supports to prevent the ring from being crushed when the gland follower is tightened down. The lantern ring is dimensioned to have an outer surface closely dimensioned to the inner bore of the stuffing box. In one embodiment the lantern ring is a suspended lantern ring with an inner diameter greater than the shaft to avoid any and all contact with the shaft in order to extend its working life.

The pillar lantern ring is split between two opposite columns or pillars to provide easy installation over an installed device shaft. There are at least two or three pillars per half so that there at least four pillars per assembled lantern ring. Preferably, there are at least three to six pillars per half, and preferably both halves are identical. The number and size of the pillars depends on the overall shaft and stuffing box dimensions. For large devices a brace or ring is formed between the pillars to provide increased strength and prevent collapse when the gland follower is tightened.

Constructing the lantern ring with pillars having a diameter smaller than the annular dimension of the lantern ring end caps allows for a larger reservoir volume of flush in case of temporary flush loss compared to a conventional lantern ring with holes between the outer and inner groove surfaces of the lantern ring. In a preferred embodiment of the invention, the outer surfaces of one or both of the front and rear end caps may include a groove to receive an O-ring to improve the seal between the impeller end and the power end of the stuffing box.

In a shaft sealing system including the pillar suspended lantern ring in accordance with the invention, a bearing or bushing seal element is positioned at the impeller end, and at least one complimentary flexible packing ring is inserted into the seal cavity at the power end. Usually, three packing rings are preferably installed. The bearing or bushing seal element and the lantern ring are all split to provide easy installation over an installed device shaft. The lantern ring in accordance with the invention having an impeller end cap element and a motor end cap element supported by the pillars is placed at the motor end of the bearing or bushing at the location of the flush port and may have an inner diameter greater than the shaft and an outer diameter closely dimensioned to the inner bore of the stuffing box for extending the useful life of the lantern ring.

Accordingly, it is an object of the invention to provide an improved pillar lantern ring to be inserted into a seal cavity of a rotary mechanical device.

It is another object of the invention to provide an improved pillar lantern ring having columns between a bottom end cap and an upper end cap to be inserted into a seal cavity of a rotary mechanical device.

A further object of the invention is to provide an improved shaft sealing system for a rotary mechanical device including a rigid bearing member for supporting the impeller end of the device shaft and a pillar lantern ring with an increased reservoir for flush fluid to be positioned at the flush port.

Yet another object of the invention is to provide an improved shaft sealing system for a rotary mechanical device including a rigid bearing member and a lantern ring for increasing the amount of seal fluid entering the seal cavity with at least one O-ring positioned on the outer surfaces of the end cap elements of the lantern ring.

Still another object of the invention is to provide an improved pillar lantern ring for a rotary mechanical device having an inner diameter spaced apart from the shaft and an outer diameter closely dimensioned to the inner bore of the stuffing box with pillars supporting the impeller end cap element and the motor end cap element of the lantern ring to provide for an increased fluid reservoir in the stuffing box.

Yet another object of the invention is an improved lantern ring with at least one outer O-ring on each end lantern ring end cap for improved isolation of the product being handled and seal fluid in the seal cavity.

Still other objects and advantages of the invention will in part be obvious and will in part be apparent from the specification.

The invention comprises a product possessing the features, properties, and the relation of components and a method for manufacture which will be exemplified in the product hereinafter described and the scope of the invention will be indicated in the claims.

BRIEF DESCRIPTION OF THE DRAWINGS

For a fuller understanding of the invention, reference is had to the following description taken in connection with the accompanying drawings, in which.

DESCRIPTION OF THE PREFERRED EMBODIMENTS

Figure 1:
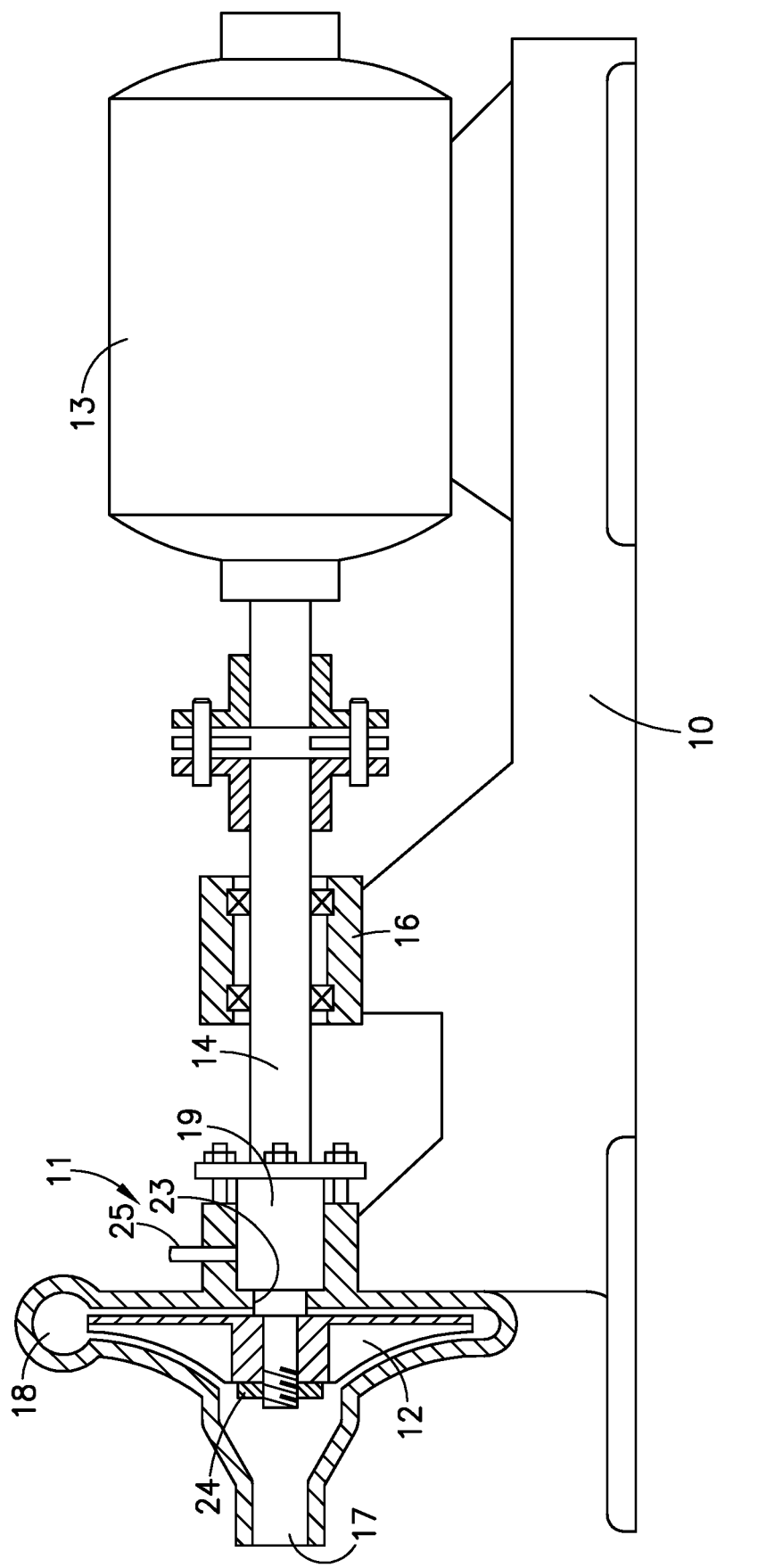
FIG. 1 is a partial cross-sectional view of a typical rotary fluid pump of the type suitable to install a seal system having a pillar lantern ring in accordance with the invention.

FIG. 1 illustrates a generic form of a centrifugal pump 11 in cross-section mounted on a frame 10. Pump 11 includes a centrifugal impeller 12 driven by an electric motor 13 that drives a rotary shaft 14 coupled to impeller 12. Shaft 14 is supported by a bearing housing 16 and rotates to draw fluid in through an impeller inlet 17 and expel the fluid out through a radial impeller outlet 18. Pump 11 includes a housing 19 that defines a seal cavity or stuffing box 22 and shaft 14 passing therethrough as shown in detail in FIG. 2. Housing 19 includes an opening 23 through which shaft 14 passes to engage impeller 12 and also includes a flush port 25 for introduction of seal fluid, such as water, into seal cavity 22. Shaft 14 is coupled to impeller 12 by a nut or fastener 24 at the end portion of shaft 14 projecting through impeller 12.

Pump 11 operates by drawing a fluid to be pumped into inlet 17. During pumping, fluid tends to migrate and be forced into seal cavity 22 through opening 23. A wide variety of seals and venting configurations are available to be placed in seal cavity 22 abutting opening 23 in order to restrict and limit entry of pumped fluid into seal cavity 22. If fluid enters seal cavity 22 and migrates to bearing housing 16, the bearings will be subject to substantial degradation due to the corrosive action of the pumped fluid.

Figure 2:
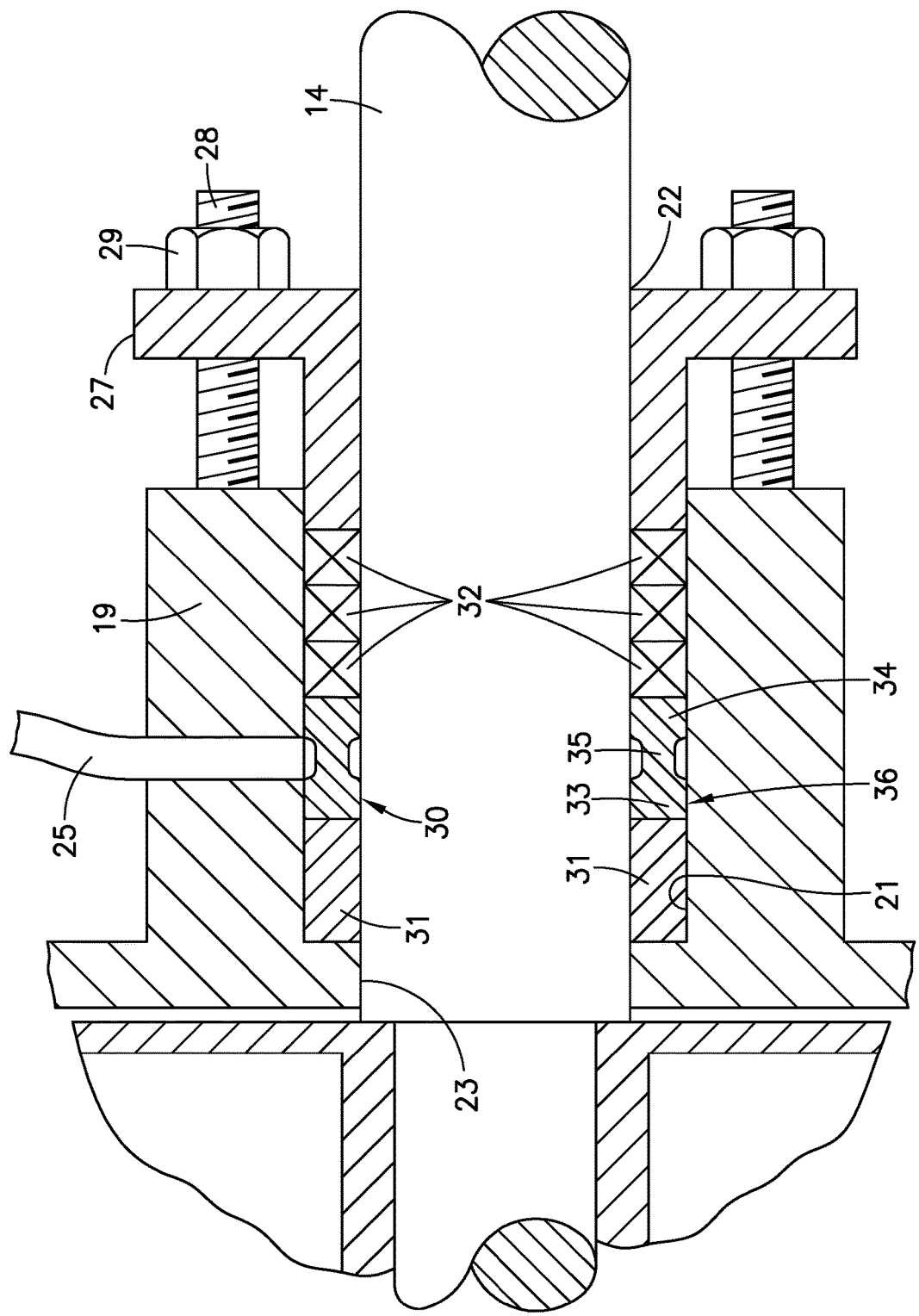
FIG. 2 is an enlarged cross-sectional view of the seal cavity of the pump of FIG. 1 with a shaft sealing system including a rigid seal element, a pillar lantern ring and packing in accordance with the invention.

FIG. 2 is an enlarged sectional view of seal cavity 22 with a shaft sealing system in accordance with the invention in place. Seal cavity 22 is defined radially by an inner bore 21 and the diameter of shaft 14. The motor end of seal cavity 22 is defined by a gland follower 27 mounted on gland bolts 28 and secured in place by gland nuts 29.

As shown in FIG. 2, the shaft sealing system installed in seal cavity 22 includes a bearing or bushing seal element 31 positioned against the impeller end of seal cavity 22 with a pillar lantern ring 30 on the motor side of seal element 31. These elements are secured within seal cavity 22 by at least one compressible packing ring 32 and gland follower 27. Pillar lantern ring 30 is positioned at the fluid flush port 25. Various types of packing rings suitable for use are shown in U.S. Pat. Nos. 5,370,926, 4,559,862, 4,431,698, 4,371,180 and 4,298,207, the contents of which are incorporated by reference in their entirety.

Figure 3:
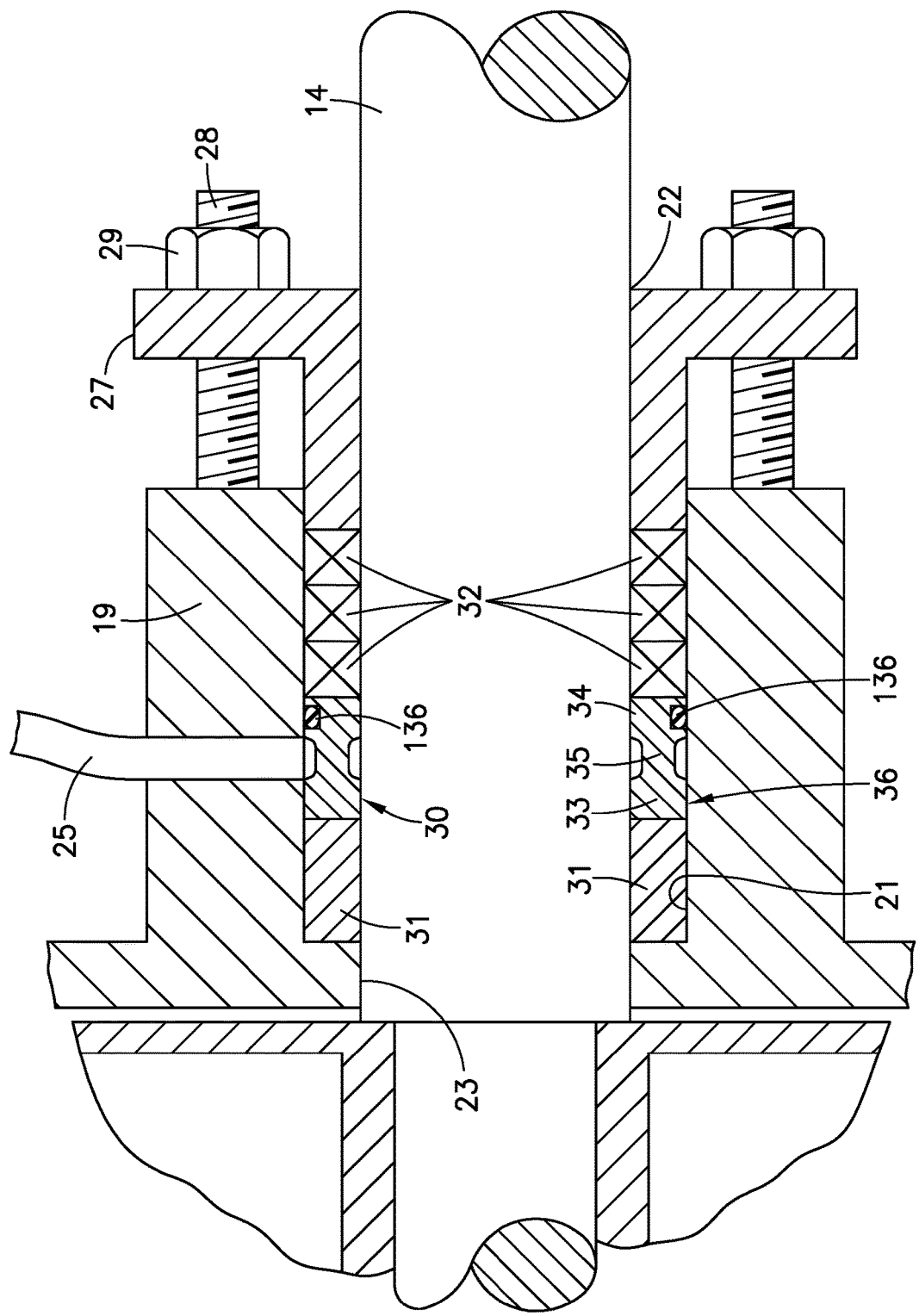
FIG. 3 is an enlarged cross-sectional view of the seal cavity of the pump of FIG. 1 showing the shaft sealing system of FIG. 2 with an O-ring installed on an end cap of the pillar lantern ring in accordance with the invention.

FIG. 3 is consistent with FIG. 2 and illustrates a shaft sealing system in accordance with the invention wherein a pillar lantern ring 130 includes an O-ring 136 on the power side of lantern ring 130. A bearing or bushing seal element 31 and pillar lantern ring 130 are custom made for a particular stuffing box of a device and the shaft size.

Figure 4:
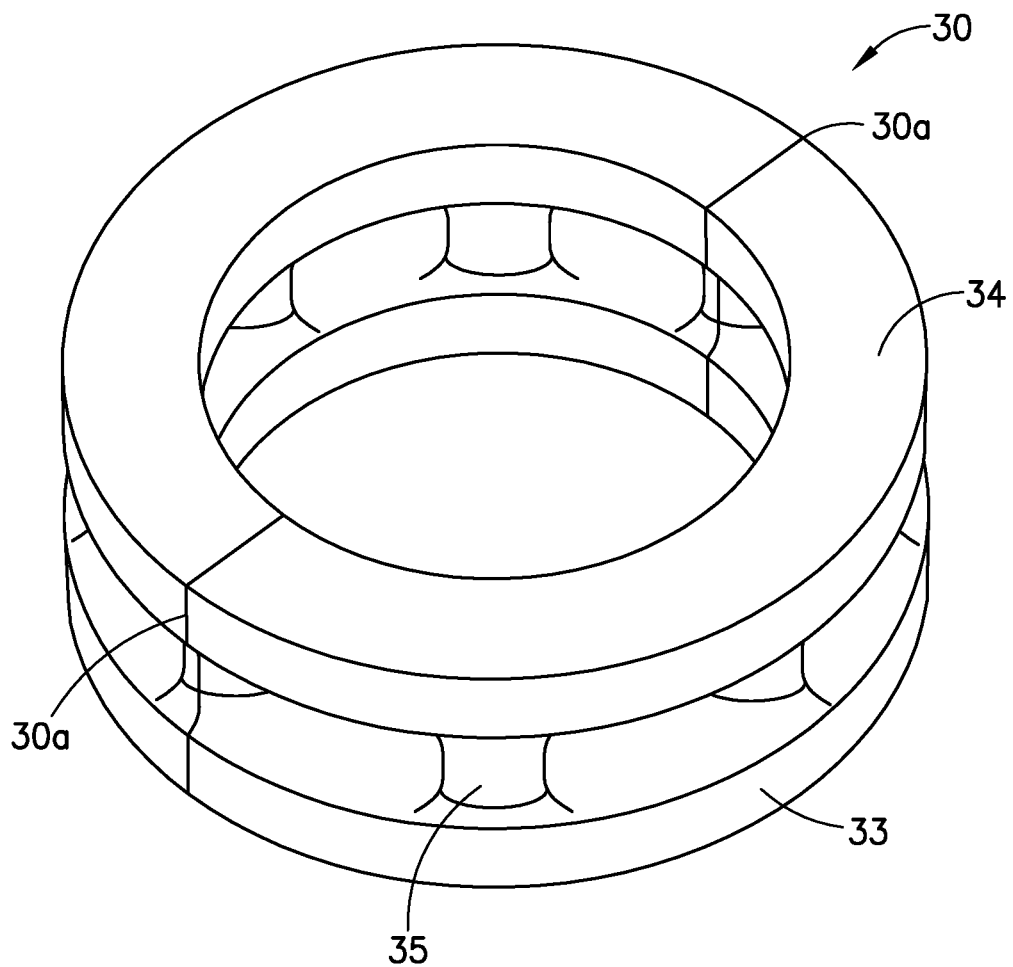
FIG. 4 is a perspective view of a split pillar lantern ring in accordance with the invention.
Figure 5:
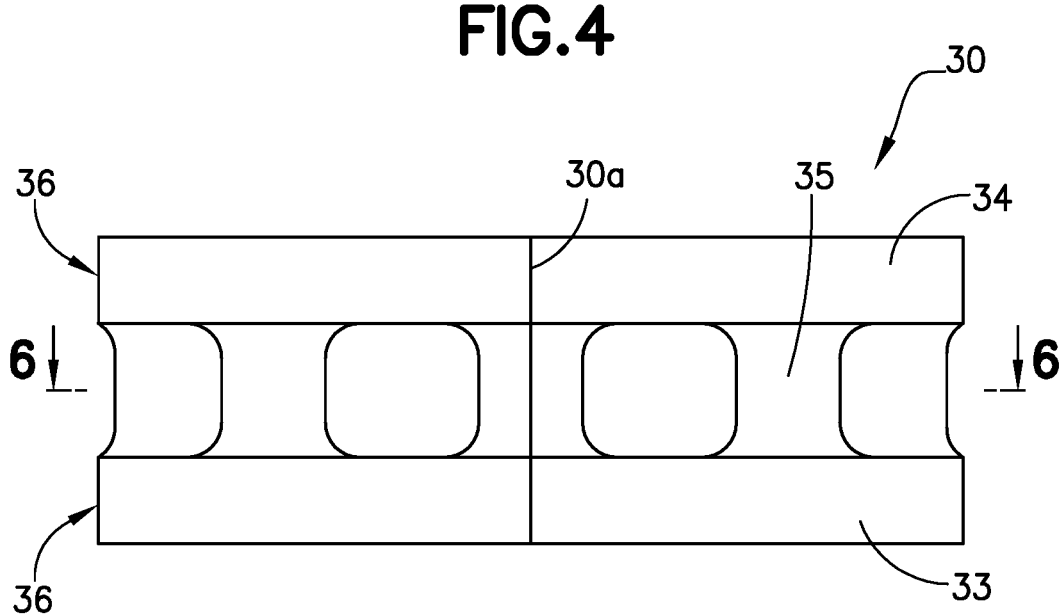
FIG. 5 is a side elevational view of the pillar lantern ring of FIGS. 2 and 4.

In FIG. 4, pillar lantern ring 30 is shown in perspective, and in FIG. 5 in a side elevational view. Pillar lantern ring 30, as are all the embodiments, is split along a split line 30a and includes a bottom end cap or land 33 and an upper end cap or land 34 with a plurality of columns 35 therebetween.

Figure 6:
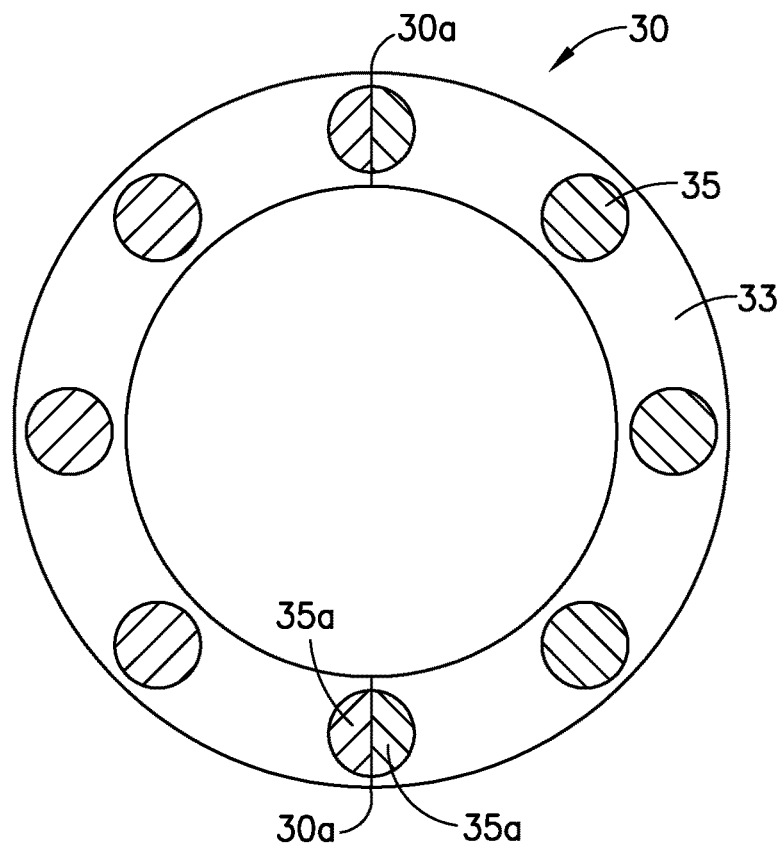
FIG. 6 is a sectional view of the pillar lantern ring of FIG. 4 taken along line 6-6 of FIG. 5.
Figure 7:
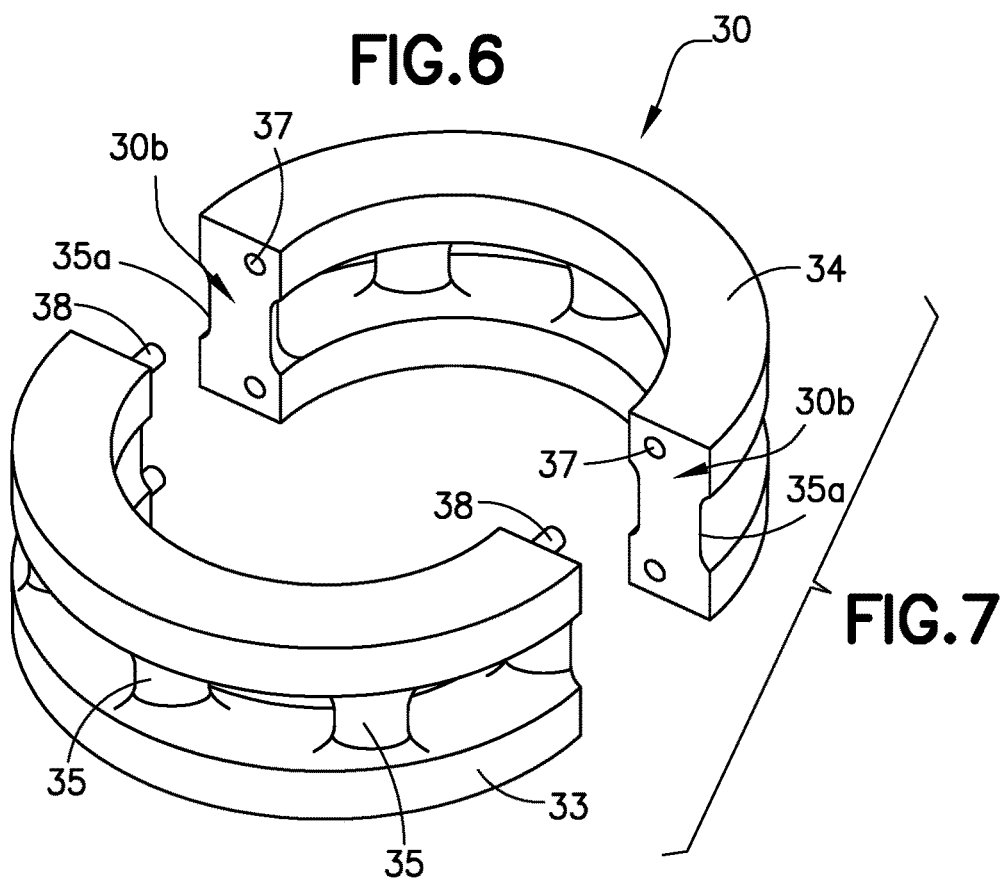
FIG. 7 is a perspective view of the pillar lantern ring of FIG. 4 split through two columns.

As can be seen in FIG. 6, the diameter of each column 35 is smaller than the annular radial dimension of end caps 33 and 34. FIG. 6 is a sectional view through line 6-6 in FIG. 5 showing. Pillar lantern ring 30 includes an even number of columns 35, in this case eight. As can be seen in FIG. 7, when split along split line 30a, pillar lantern ring 30 is split through two opposite columns 35a to preserve the structural integrity of the assembled and installed pillar lantern ring 30. Also shown on a face of split column 35a are a pair of alignment holes 37 in one half and mating alignment pins 38 in a mating half.

In the illustrated embodiment pillar lantern ring 30 includes eight columns, but may include anywhere between six and 10 or 12 depending on the size of the stuffing box and the amount of flush fluid desired to reach the shaft. The more columns present, the lesser the open volume between the end caps and less flush.

A perspective view of split pillar lantern ring 30 is shown in FIG. 7. In each case, bottom end cap 33 and top end cap 34 are substantially of equal length.

Figure 8:
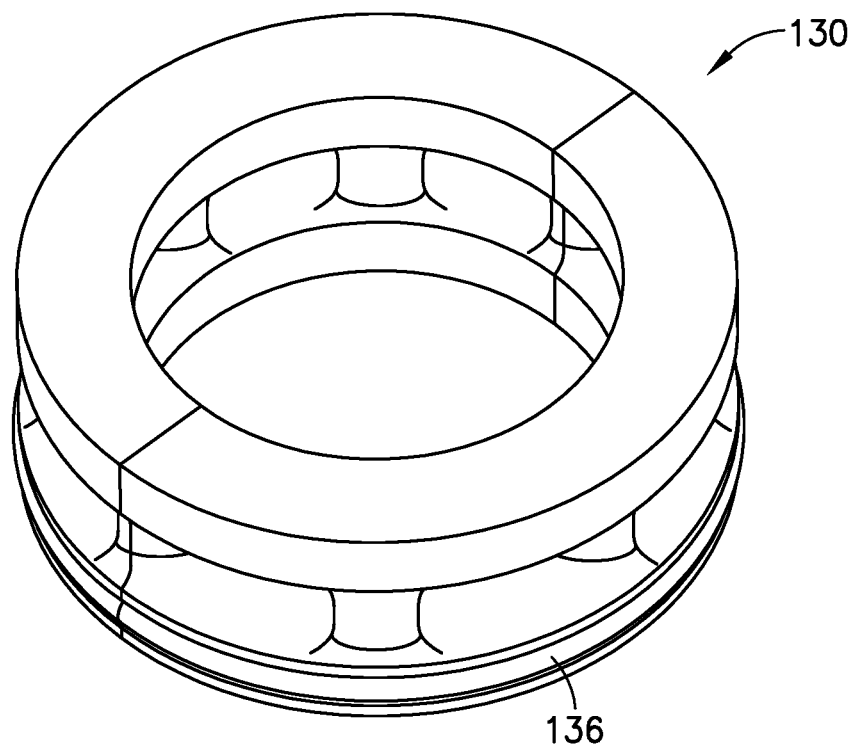
FIG. 8 is a perspective view of a pillar lantern ring including one O-ring on an end cap of the lantern ring.

As shown in FIG. 8, pillar lantern ring 30 may be formed to include an O-ring 136 in one or both end caps to aid in holding pillar lantern ring 30 in place and in sealing. O-ring 136 can be formed of a variety of resilient materials, including perfluoroelastomers or other resilient material compatible with the pumped fluid for providing an additional barrier to isolate the motor end of shaft 14 from fluid entering seal cavity 22. O-ring 136 provides an additional obstacle to prevent fluid from entering seal cavity.

Figure 9:
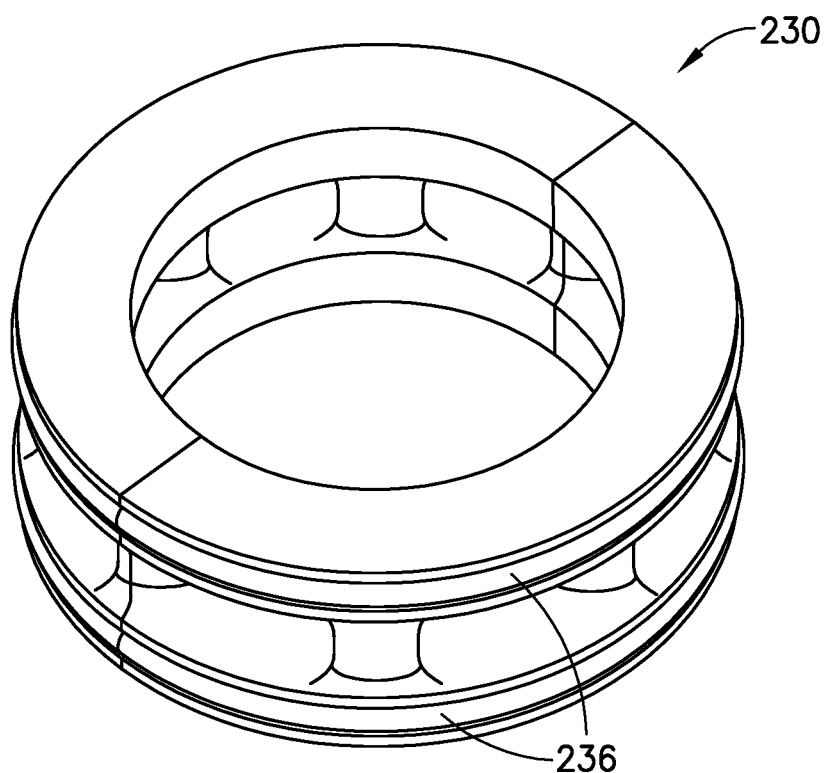
FIG. 9 is a perspective view of a pillar lantern ring including two O-rings on the end caps of the lantern ring.

FIG. 8 shows pillar lantern ring 130 of FIG. 3 in perspective with O-ring 136. FIG. 9 illustrates a pillar lantern ring 230 with a pair of O-rings 236 also suitable for use in seal cavity 22 shown in FIGS. 2 and 3.

Figure 10:
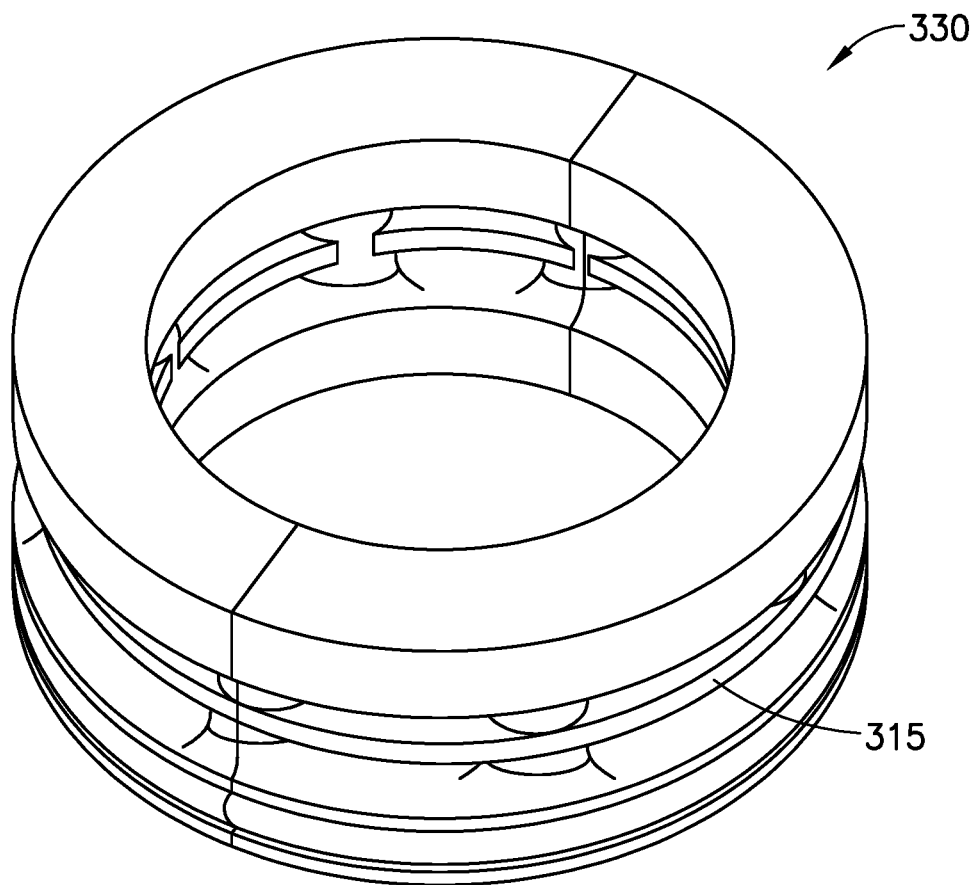
FIG. 10 is a perspective view of a pillar lantern ring including a brace and one O-ring on an end cap of the lantern ring.
Figure 11:
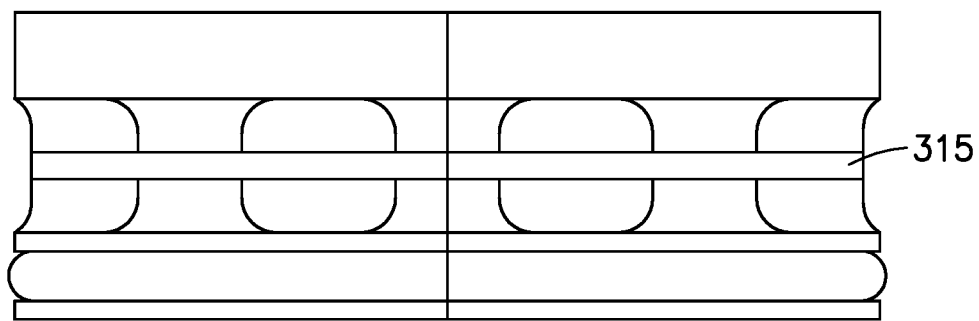
FIG. 11 is an elevational view of a pillar lantern ring including a brace and one O-rings on an end caps of the lantern ring.
Figure 12:
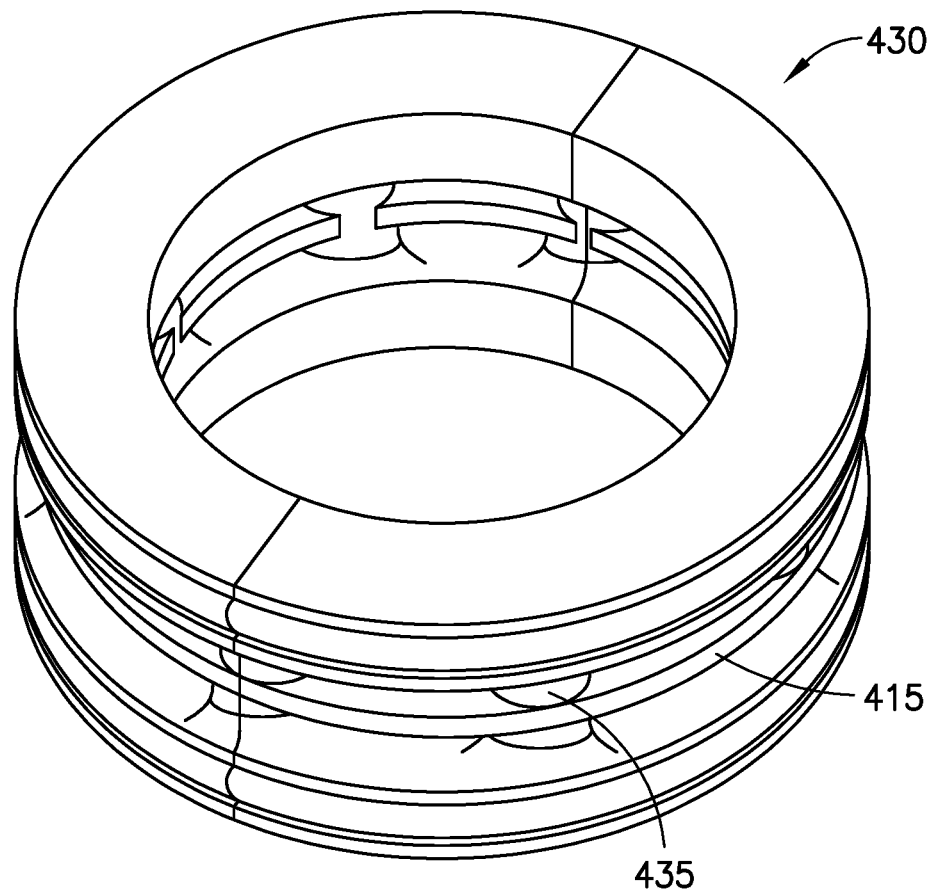
FIG. 12 is a perspective view of a pillar lantern ring including a brace and two O-rings on the end caps of the lantern ring.
Figure 13:
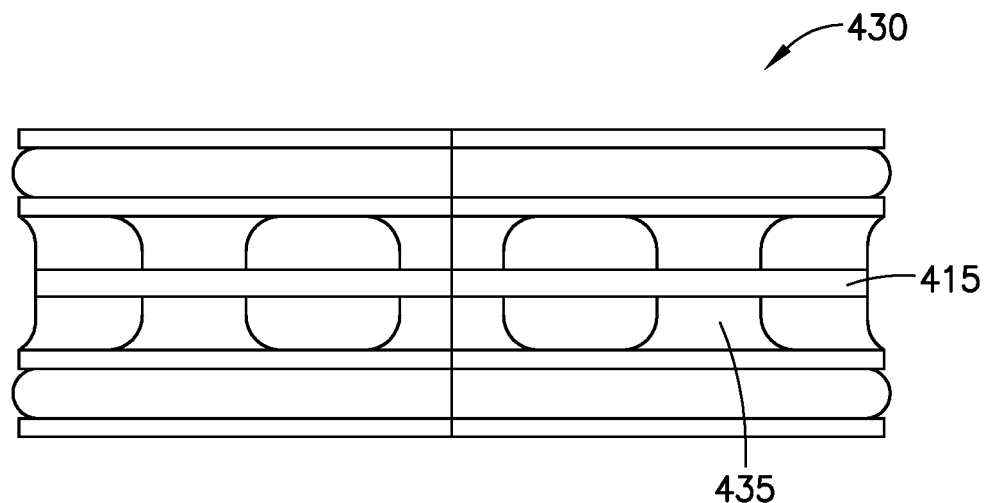
FIG. 13 is an elevational view of a pillar lantern ring including a brace and two O-rings on the end caps of the lantern ring.

For larger and heavy duty applications and those uses requiring a pillar lantern ring 330 of increased strength, the pillar lantern ring itself requires increased strength to prevent it from collapse when the gland follower is tightened. In this case, a pillar brace 315 shown in FIGS. 10 and 11 between pillars 335 imparts additional strength to pillar lantern ring 330 so that it will not collapse when gland follower 27 is tightened. Two O-rings may be included on a pillar lantern ring 430 with a brace 415 as shown in FIGS. 12 and 13.

Figure 14:
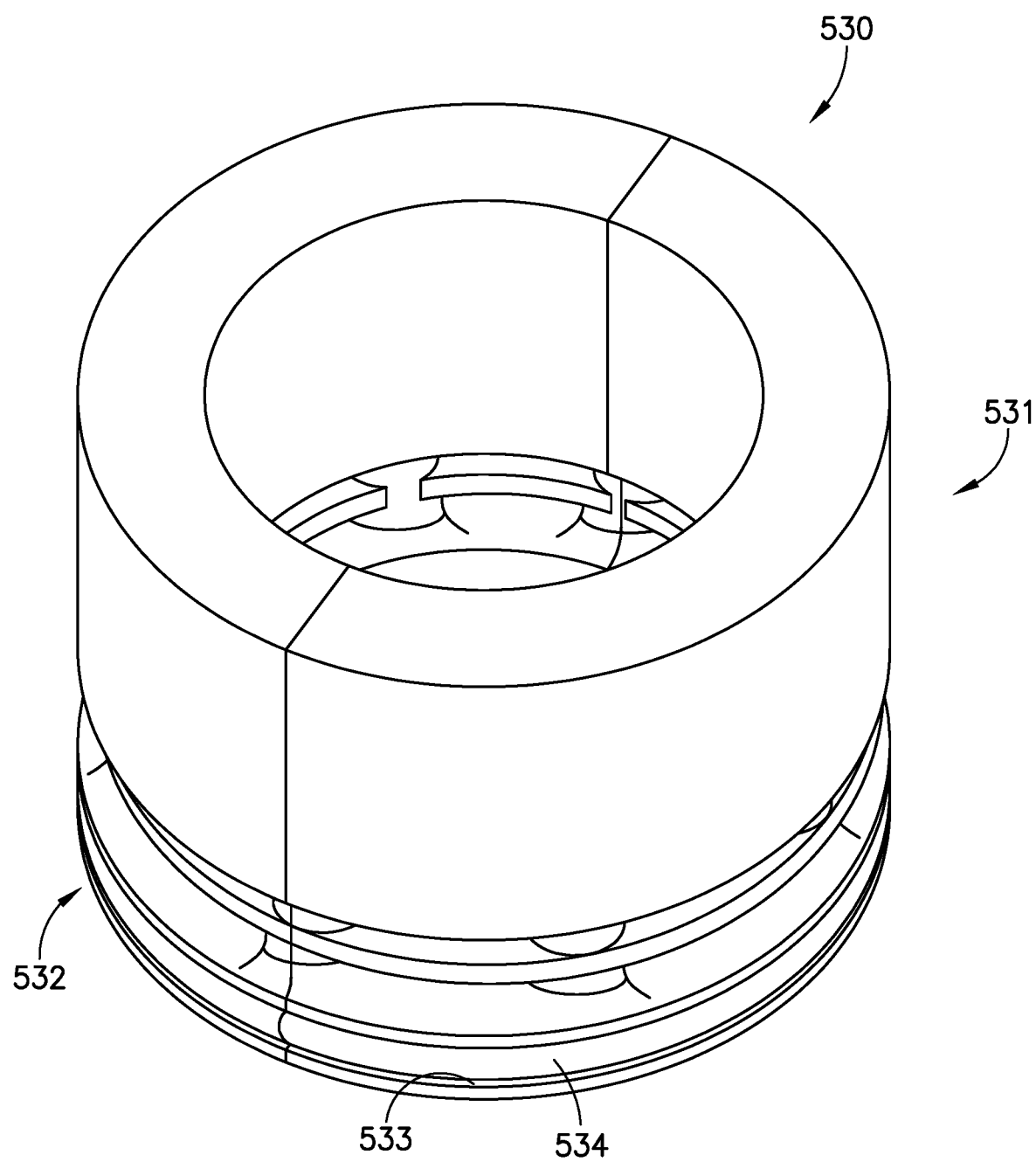
FIG. 14 is a perspective view of a pillar lantern ring having end caps of different heights and including a brace and one O-ring on an end cap of the lantern ring.

It is fully within the scope of the invention to vary the lengths of either or both end caps. In this case FIG. 14 illustrates a sealing element 530 including a bottom bearing or bushing section 531 formed integrally with a lantern ring section 532 in an elevational view. Here, upper lantern ring section 532 is formed with a groove 533 for receiving an O-ring 534.

Seal element 31 is a substantially cylindrical rigid member with an outer surface 37 and with an inner bore 38 dimensioned to be slightly larger than the outer dimension of pump shaft 14 and fit within inner bore 21 of pump housing 19. When formed of bearing grade material and formed with close tolerances, inner bore 38 of seal element 31 provides a bearing surface for shaft 14 when in position as shown in FIGS. 2 and 3, and this is custom dimensioned for a particular mechanical device.

Seal element 31 and pillar lantern ring 32 are substantially rigid and formed of materials that will not be attacked or destroyed by corrosive fluids being transported by pump 11. Preferred materials of construction include non-ferrous materials, molybdenum/carbon or glass or carbon filled thermoplastic material, such as nylon, polytetrafluoroethylene (PTFE), or any other suitable plastic material that will not be degraded by the materials in the device or the temperatures encountered. Materials are selected that can provide a suitable bearing surface and are resistant to most industrial solutions.

Materials are selected that can provide a suitable bearing surface and are resistant to most industrial solutions. Suitable bearing materials are those that provide suitable chemical, temperature, compressive strength, flexural strength and wear characteristics and can be appropriately machined to yield the desired bearing dimensions and tolerances. Such bearing materials include, but are not limited to, polymers, including polyphenylene sulfides, polyimidizoles, polyamideimides, polybenzylimidizoles, PEEK polymers obtained by step-growth polymerization by the dialkylation of bisphenolate salts, PTFE, perfluoroalkoxy, and formulations containing these polymers in a major proportion.

The pillar lantern ring in accordance with the invention may be manufactured by machining a hollow cylinder of suitable material, molding, or by additive manufacturing techniques. Preferably, the pillar lantern ring is manufactured by additive manufacturing. These latter techniques include 3D Printing, Rapid Prototyping (RP), Direct Digital Manufacturing (DDM), layered manufacturing and additive fabrication. In this process, 3D objects are built by adding layer-upon-layer of material, whether plastic, neat or filled, and metal.

In order to install seal element 31 and pillar lantern ring 30 in position in seal cavity 22, seal element 31 and pillar lantern ring 30 are split along a center line 31a and 30a, respectively. Splitting seal element 31 and pillar lantern ring 30 allows seal element 31 and pillar lantern ring 30 to be placed about installed shaft 14 and pushed into position at the impeller end of seal cavity 22. Generally, at least one, and preferably three, packing rings 32 are positioned on the gland side of pillar lantern ring 32.

Seal element 31 and pillar lantern ring 30 are split along center lines 31a and 31b and are formed with a pair of corresponding holes 41 on both halves of split bushing seal 31 for receiving mounting pins 42 for realignment and reassembly of seal element 31. In this construction, pins 42 insure that when seal element 31 and pillar lantern ring 30 are secured about shaft 14, the open volume around pillars 35 are properly aligned on both sections. The length of pillars 35 are dimensioned to align with flush port 25 formed in housing 19.

In a conventional lantern ring of the type shown in the Heinz patent or in Wilkinson's integral bearing and lantern ring patent, grooves are formed on both the inner and outer surfaces and holes are made between the grooves to provide fluid access fro the flush port to the shaft. Pillar lantern rings in accordance with the invention in essence provide two end caps and supporting columns between the end caps. The pillar construction provides for a substantial increase in available volume to hold flush fluid.

The following Example is set forth by way of illustration to help explain the invention, and is not intended to be limiting in any way.

Example 1

A pillar lantern ring prepared for the stuffing box of a device with a 2.50-inch bore and a 1.75-inch diameter shaft typically will have a radial width of 0.375 inch. The overall height is 0.875 inch, and each end cap is 0.125 inch in height. Each half of the lantern ring has three full pillars and two halves at each end and has a void volume between the end caps of 0.9876 inch$^3$. In contrast, a combined bearing and lantern rig element constructed pursuant to the Wilkinson patent of the same dimensions and 8 flush holes between the inner and outer flush grooves yields a void volume of 0.480 inch$^3$. Thus, a pillar lantern ring provides more than double the flush fluid to the shaft.

In this Example, columns 35 are 0.25 inch in diameter, and the radial dimension of end caps 33 and 34 is 0.375 inch, or about two-thirds the radial dimension. The diameter may vary from about 50 to 100% of the radial dimension. Increasing the diameter reduces the volume, and reducing the diameter reduces the strength of the pillar lantern ring.

A pillar lantern ring design in accordance with the invention, in addition to providing a larger sump at pressure, also substantially reduces turbulence in that sump by virtue of smooth round, obround, or oval pillars. This eliminates "choke" points and pressure drops present in conventional lantern rings (holes drilled 90 degrees to the plane of the lantern ring web), thus providing instant delivery of fluid from the inlet flush hole to the shaft.

Packing materials are described in the aforementioned U.S. Pat. Nos. 4,298,207, 4,371,180, 4,431,698, 4,559,862, and 5,370,926, the contents of each of which are incorporated herein by reference in their entirety. More particularly, useful materials include, but are not limited to, mechanically and/or thermally resilient component of graphite tape, expanded graphite foil, graphite fiber, carbon fiber, polybenzimidazole (PBI) fiber, PEK fiber, PEEK fiber, PFA fiber, aromatic polyamide fiber, Inconel or Monel wire, or combinations thereof. In another aspect of the invention, the at least one packing member is a material selected from the group consisting of carbonized yarns, graphitized yarns, exfoliated graphite yarns, ceramic yarns, and glass yarns. Tension or lip seal rings may comprise the same or different components of the same or different components. The packing rings or members may comprise mechanically and/or thermally components, whether individually or by combinations thereof, i.e., corner yarns, resilient core, etc. The designs and materials are chosen to resist packing consolidation.

Braided packing rings may include fibers of flax, jute, asbestos, or a synthetic material, such as polytetrafluoroethylene, which fibers are formed into yarns or strands and which are braided together about core strands. The result is typically a packing having a square cross-section and herringbone weave pattern extending in an axial direction along the packing. Typical packing members are illustrated in U.S. Pat. No. 3,646,846, incorporated herein by reference.

It can readily be seen that the seal system including a cylindrical seal and seal system constructed in accordance with the invention can be easily installed in a conventional rotary impeller pump with pins to guarantee alignment of the seal upon installation. Generally three packing rings are added to complete installation. When in place, a bearing seal element 31 will support the impeller end of pump shaft 14, providing an additional bearing surface to aid in eliminating the whip commonly found in pump shafts. Since the clearance between pump shaft 14 and seal element is relatively small, seal water entering the open volume in pillar lantern ring 30 would be considerably throttled, thereby minimizing the quantity of seal water flushing and lubricating the bearing and finally entering into and diluting the product being pumped.

Due to the close tolerances available, improved support of the impeller is assured, resulting in longer life of the main bearings and packing materials as well as reduced wear of the throat of the rotary device. Minimum seal water is required with less product contamination because of this throttling effect. Minimum external leakage also results from the installation of the sealing system constructed and arranged in accordance with the invention.

It will thus be seen that the object set forth above, among those made apparent from the preceding description are efficiently attained and, since certain changes may be made in the device set forth without departing from the spirit and scope of the invention, it is intended that all matter contained in the above description and shown in the accompanying drawings shall be interpreted as illustrative and not in a limiting sense. Each split half has a pillar at each end of the semi-circular part that is split and when installed and mated with a second half yields a part with a full pillar at the split for providing structural integrity. Thus, each installed lantern ring will have an even number of pillars.

It is also to be understood that the following claims are intended to cover all of the generic and specific features of the invention herein described and all statements of the scope of the invention, which, as a matter of language, may be said to fall there between.

What is claimed is:

1. A method for forming a pillar lantern ring for use in an annular seal cavity of a rotary mechanical device having an output end and a power end with a shaft running through the seal cavity, comprising: using additive manufacturing to form a substantially rigid unitary cylindrical body having an outside surface dimensioned to fit into the annular seal cavity of the rotary mechanical device with a bottom annular end cap having an outside face and an opposed inside face defining a height therebetween and an upper annular end cap having an inside face and an opposed outside face defining a height therebetween with a plurality of integrally formed substantially cylindrical axial columns connecting the two opposed inside faces of the two end caps.

2. The method for forming the pillar lantern ring of claim 1, including forming columns that are cylindrical.

3. The method for forming the pillar lantern ring of claim 2, including forming columns that have a diameter smaller than a radial thickness of the annular end caps.

4. The method for forming the pillar lantern ring of claim 1, including forming columns that have fillets at both ends of the columns connecting to the end caps.

5. The method for forming the pillar lantern ring of claim 1, including forming the unitary body with the height of each of the two end caps substantially the same.

6. The method for forming the pillar lantern ring of claim 1, including forming an even number of columns.

7. The method for forming the pillar lantern ring of claim 1, including forming the substantially rigid cylindrical body from a non-ferrous metal material.

8. The method for forming the pillar lantern ring of claim 1, including forming the substantially rigid cylindrical body from a thermoplastic material.

9. The method for forming the pillar lantern ring of claim 1, including forming the unitary body from a thermoplastic material filled with at least one of carbon, glass and mixtures thereof.

10. The method for forming the pillar lantern ring of claim 1, including forming a groove on the outer groove of at least one of the end caps for receiving an O-ring.

11. The method for forming the pillar lantern ring of claim 10, including forming an O-ring groove on the outer surface of both end caps.

12. The method for forming the pillar lantern ring of claim 1, including the step of splitting the body axially to facilitate installation over an installed shaft.

13. The method for forming the pillar lantern ring of claim 12, including forming corresponding alignment holes in each of the split halves.

14. The method for forming the pillar lantern ring of claim 1, wherein the additive manufacturing is selected from 3D Printing, Rapid Prototyping (RP), Direct Digital Manufacturing (DDM), layered manufacturing and additive fabrication.

15. The method for forming the pillar lantern ring of claim 1, wherein the additive manufacturing is 3D Printing.

* * * * *